(12) United States Patent
Srinivasachar

(10) Patent No.: US 8,080,088 B1
(45) Date of Patent: Dec. 20, 2011

(54) FLUE GAS MERCURY CONTROL

(76) Inventor: Srivats Srinivasachar, Sturbridge, MA (US)

(*) Notice: Subject to any disclaimer, the term of this patent is extended or adjusted under 35 U.S.C. 154(b) by 549 days.

(21) Appl. No.: 12/042,962

(22) Filed: Mar. 5, 2008

Related U.S. Application Data

(60) Provisional application No. 60/904,985, filed on Mar. 5, 2007, provisional application No. 60/958,464, filed on Jul. 5, 2007.

(51) Int. Cl.
*B01D 53/06* (2006.01)

(52) U.S. Cl. ............. 95/107; 95/134; 96/108; 96/150; 502/417

(58) Field of Classification Search ............ 96/108, 96/150; 95/107, 134; 502/416, 417
See application file for complete search history.

(56) References Cited

U.S. PATENT DOCUMENTS

| | | | |
|---|---|---|---|
| 4,257,815 A | 3/1981 | Hauser | |
| 4,500,327 A | 2/1985 | Nishino et al. | |
| 5,556,447 A | 9/1996 | Srinivasachar et al. | |
| 6,524,371 B2 | 2/2003 | El-Shoubary et al. | |
| 6,638,347 B2 | 10/2003 | El-Shoubary et al. | |
| 6,848,374 B2 | 2/2005 | Srinivasachar et al. | |
| 6,863,713 B1* | 3/2005 | Ghosal et al. ............ | 95/117 |
| 6,953,494 B2 | 10/2005 | Nelson, Jr. | |
| 6,974,564 B2 | 12/2005 | Biermann et al. | |
| 2003/0206843 A1 | 11/2003 | Nelson, Jr. | |
| 2004/0206276 A1 | 10/2004 | Hill et al. | |
| 2005/0039598 A1 | 2/2005 | Srinivasachar et al. | |
| 2006/0205592 A1* | 9/2006 | Chao et al. ............ | 502/417 |
| 2006/0210463 A1 | 9/2006 | Comrie | |

FOREIGN PATENT DOCUMENTS

JP     2000219507 A  *  8/2000

OTHER PUBLICATIONS

"Brominated Sorbents for Small Cold-Side ESPs, Hot-Side ESPs, and Fly Ash Use in Concrete," Progress Report—Dec. 2006, DOE Nat'l Energy Tech Lab and Sorbent Technologies.

"Field Demonstration of Enhanced Sorbent Injection for Mercury Control", Dec. 11, 2006, DOE Cooperative Agreement DE-FC26-04NT42306, Allstom.

* cited by examiner

*Primary Examiner* — Robert A Hopkins

(74) *Attorney, Agent, or Firm* — Brian M. Dingman; Mirick, O'Connell, DeMallie & Lougee, LLP

(57) ABSTRACT

An adsorbent composition for removing mercury from a flue gas stream, and a method of its use. The composition is a powdered activated carbon having at least one of a halogen-containing component and an alkaline component dispersed thereon. A flow agent can be composited with the material to maintain flowability in situ.

33 Claims, 7 Drawing Sheets

FLUE GAS MERCURY CONTROL

CROSS REFERENCE TO RELATED APPLICATIONS

This application claims priority of Provisional Patent Application Ser. No. 60/904,985, filed on Mar. 5, 2007, the entire disclosure of which is incorporated herein by reference. This application also claims priority of Provisional Patent Application Ser. No. 60/958,464, filed on Jul. 5, 2007, the entire disclosure of which is incorporated herein by reference.

FIELD OF THE INVENTION

The present invention relates to the removal of mercury from the flue gases generated during the combustion of fossil fuels such as coal, or the combustion of solid wastes.

BACKGROUND OF THE INVENTION

Activated carbon is used in various gas cleaning applications, and is finding increasing application in mercury control in flue gas from coal-fired power plants and waste incinerators. In a typical application, powdered activated carbon ($d_{50}$—particle size corresponding to 50% of the mass of the sample—approximately 25 microns) is injected into the flue gas duct upstream of a particulate collection device such as a precipitator, fabric filter, cyclone or particulate scrubber. The injected powdered activated carbon particles capture mercury species from the flue gas and are removed in the collection device. In this manner, the mercury species are prevented from being emitted into the environment via the flue gas. If the particulate collection device is a precipitator then the mercury removal efficiency for a given sorbent consumption rate is typically significantly lower than when the collection device is a fabric filter. This is because the fabric filter allows significantly improved contact between the flue gas and the sorbent when the sorbent is collected on the bag compared to a precipitator, where the flue gas-sorbent content happens only while the sorbent particles are suspended in the flue gas.

The injection location for the activated carbon in the power plant can vary. Activated carbon has been injected at lower temperatures of around 300° F. into the flue gas to capture mercury as well as at higher temperatures of around 600 to 800° F. (See U.S. Pat. Nos. 6,848,374 and 6,953,494). Typical carbon injection rates that are considered economical vary between 0.2 to 1.0 lb/MWh.

Powdered activated carbon can be injected into the flue gas in a coal-fired power plant at several locations. One such location is the region upstream of the air heater at temperatures between 500 and 900° F. Powdered activated carbon is typically injected with air as the carrying medium and through lances that penetrate completely into the flue gas duct to ensure good distribution of the sorbent with the flue gas.

During the process of injection at high temperature locations such as into the flue gases at the air heater inlet in a coal-fired plant, the carbon particles are subjected to high temperatures as well as high oxygen concentrations within the injection lances. Consequently, the carbon particles can start oxidizing and burning within the injection lances, deteriorating the sorbent and potentially even destroying it, as well as potentially causing other operational problems such as local deposition, plugging and over-heating. This is one additional challenge of using activated carbon sorbent for mercury control.

When powdered activated carbon is used in various applications with differing flue gas compositions, the efficiency of mercury capture varies significantly. For example, in the case when coal with low levels of halogen is combusted, the flue gases generated therein have a low concentration of halogen species such as HCl. In such cases, plain activated carbon performs poorly, i.e. the amount of material required to achieve desired capture efficiency is higher than when higher levels of halogen species are present in the flue gas. Methods to overcome this problem have been described, such as in U.S. Pat. No. 6,953,494, and include adding a halogen component to the activated carbon sorbent prior to injection in the flue gas. A method to add the halogen component as a separate stream from the activated carbon has also been used to address this issue. The literature shows data on the improved performance of halogen-treated carbon for low-halogen content flue gas applications versus a plain activated carbon.

U.S. Pat. No. 4,500,327 describes a method of removal of mercury vapor and an adsorbent for the same, comprising activated carbon having as supported thereon one or more components including sulfur, sulfates and nitrates of various metals or ammonium, and bromides and iodides of K, Na or ammonium, oxide of iodine, oxy-acid corresponding to oxide of iodine or salt of the said oxy-acid.

U.S. Pat. No. 5,556,447 describes a process for mercury capture wherein a carbonaceous sorbent doped with a halide salt is used to remove mercury from process gases containing mercury vapor. In the same patent a process for removing mercury is also described wherein the carbonaceous sorbent is injected in the form of an aqueous slurry, where the aqueous slurry further comprises ammonia, ammonium chloride, ammonium hydroxide, or sodium hydroxide.

U.S. Pat. No. 6,953,494 describes preparing a mercury sorbent by treating a carbonaceous substrate with an effective amount of a bromine-containing gas, especially one containing elemental bromine or hydrogen bromide, for a time sufficient to increase the ability of the carbonaceous substrate to adsorb mercury and mercury-containing compounds. The locations in the flue gas stream of injecting and collecting and removing the mercury sorbent may be varied, depending upon the exact configuration of the exhaust gas system.

U.S. Pat. No. 6,848,374 describes the deposition of a halogen on activated carbon by vaporizing halogens and condensing/adsorbing on the carbon sorbent. The patent describes another method of spraying a solution of halide salt and then delivering the wet sorbent to a jet mill/particle-particle separator. The patent does not describe a method of simultaneously drying and reducing the particle size of the carbon sorbent. Also, the need to perform particle size reduction in situ involves adding equipment for a particle size reduction system such as a jet mill (and compressed air), thus making the sorbent storage and delivery system more complicated to operate, and more expensive. In contrast, if pre-ground fine particles can be delivered, and they remain in a state that will allow their re-dispersion, such storage and delivery systems would not be needed. Also, the patent describes injection of a $SO_3$ sorbent separately from the mercury sorbent, but does not recognize the benefit of association of the alkaline material with the halogen-loaded carbon sorbent for mercury control.

U.S. Pat. Nos. 6,638,347 and 6,524,371 disclose powdered sorbent and method for removing mercury, other metals, and contaminants from a gas stream comprising powder that is characterized as containing a carbon-based powder selected from the group consisting of coal carbons, wood carbons, graphite carbons, activated carbons, coconut shell carbons, peat carbons, petroleum cokes, synthetic polymers, the like, and combinations thereof, and an effective amount (about 3 to about 10 weight percent) of cupric chloride. Optionally, sulfur, potassium iodide and permanganate, calcium hydroxide, and combinations thereof may be added to the powder. However, this composition has only been tested with fabric filters as the particulate collection device, and may not provide similarly good results when a precipitator is used for removing particulates. Also, the patents do not describe any details of how, for example, calcium hydroxide is added to the adsorbent powder.

US patent application publication 20060210463 describes processes and compositions for decreasing emissions of mercury upon combustion of fuels such as coal. Various sorbent compositions are provided that contain components that reduce the level of mercury and/or sulfur emitted into the atmosphere upon burning of coal. In various embodiments, the sorbent compositions are added directly to the fuel before combustion; are added partially to the fuel before combustion and partially into the flue gas post combustion zone; or are added completely into the flue gas post combustion zone. In preferred embodiments, the sorbent compositions comprise a source of halogen and preferably a source of calcium. Among the halogens, iodine and bromine are preferred. In various embodiments, inorganic bromides make up a part of the sorbent compositions. In this case, no carbonaceous sorbent is used, and the different components halogen and source of calcium (e.g. lime) are injected separately.

U.S. Pat. No. 6,974,564 discloses a clay and limestone byproduct from the papermaking industry (MinPlus™) as an adsorbent for mercury, which is injected into the high temperature region flue gas (around 2000° F.). The injection rates for 95 percent capture are in the range of 20 lb/MWh, a factor of 20 larger than typical activated carbon injection and 0.8-3.2 lb/MWh, for 75 percent reduction, a factor of 4 larger than typical carbon injection rates. The high injection rates are likely to be expensive, and also may affect the performance of the power plant components by depositing and fouling their surfaces. Also the injection of large quantities of material may adversely affect the performance of particulate collection devices and may result in increased particulate emissions.

A problem with many mercury control sorbents is their inability to perform with high efficiency in high concentration sulfur-containing flue gas. It has been determined that halogen-treated activated carbons for mercury control in relatively high sulfur concentration flue gases must be used at significantly higher quantities (almost 5 to 10 times) in order to achieve large reductions in mercury emissions compared to cases where the flue gases had low concentration of sulfur species such as sulfur dioxide and sulfur trioxide. The coal sulfur concentration was 2.5 percent in the high sulfur case compared to about 0.4 percent sulfur in the coal in the low sulfur case. It has been shown that a lack of halogen components in the flue gas and the presence of sulfur species in the flue gas each adversely affect the performance of activated carbon in terms of mercury removal.

Yet another problem with using activated carbon sorbents for mercury control is that when the spent carbon is mixed with the ash in the particulate collection device, it renders the ash unusable for some end-applications such as concrete. This is because when fly ash is used in concrete manufacturing, if it has certain components that adsorb the hydrophobic air entraining agents that are used in concrete manufacturing, then it is rejected for such end use. Activated carbon because of its surface area and its propensity to adsorb the air entraining agents is deleterious. A foaming index test is used to evaluate the suitability of the ash for use in concrete. If the foaming index is below a critical value, then the ash is suitable for use in concrete.

Methods to decrease the propensity of carbon from adsorbing air entraining agents have been disclosed in US Patent Application publication 20030206843. These involve modifying the surface chemistry of the carbon by treating with oxidizing components such as ozone. However, treatment with ozone is expensive and is an additional step in the sorbent preparation process. Also, the performance of the ozone-treated carbon for mercury capture is significantly deteriorated compared to the untreated carbon.

US Patent Application publication 2004/0206276 discloses the use of "sacrificial agents" that are added to cementitious mixtures containing fly ash. The sacrificial agent is a material that interacts with components of the fly ash that otherwise neutralize, repress or depress the activity of the air entraining agent component of the cementitious mixture. Representative sacrificial agents include organic compounds having sulfonate, carboxylate or amino functional groups.

Methods and materials that maintain or enhance mercury capture, while lowering foaming index impacts, are thus needed.

SUMMARY OF THE INVENTION

An objective of the invention is to provide sorbent compositions and sorbent morphologies that will overcome the limitations of the aforementioned methods including the ability to remove mercury from flue gases with a high efficiency in:

Low-halogen species concentration environments, which are created when combusting low-halogen containing fuels (less than 100 ppm by weight of fuel) such as Powder River Basin and North Dakota lignite coals.

High sulfur species environments, which are created when combusting high sulfur coals or when $SO_3$ is injected into the flue gas upstream of an electrostatic precipitator (ESP) or fabric filter. $SO_3$ is typically injected to the flue gas to enhance particulate collection and works by reducing the fly ash resistivity.

Another objective of the invention is to lower the impact of the sorbent on the properties of the fly ash (with which the sorbent is collected) in terms of its foaming index.

Yet another objective of the invention is to produce sorbents that have a much finer particle size compared to standard commercial powdered activated carbon ($d_{50}$—mean diameter is typically 20-25 microns) to improve its mercury capture performance and for them to be easily re-dispersed when injected into a flue gas without having the need to provide extra energy for re-dispersion, such as a jet mill.

Another objective of the invention is to be able to produce such sorbent compositions using a simple procedure such that the cost of manufacturing is low.

Another objective of the invention is to employ the sorbent formulations in the end application of mercury capture in combustion-derived flue gas while maximizing sorbent performance and lowering operating costs such as energy required for sorbent delivery.

Another objective of the invention is to lower the impact of the sorbent on the properties of the fly ash (with which the sorbent is collected) in terms of its foaming index.

Another objective of the invention is to prevent the carbon-based sorbent from burning during its injection into the flue gas.

This invention features an adsorbent composition for removing mercury from a flue gas stream, comprising powdered activated carbon having at least one halogen-containing component dispersed thereon and at least one alkaline component dispersed thereon. The halogen-containing component may comprise bromine. The alkaline component may be blended with the powdered activated carbon as fine particles. The alkaline component particle size corresponding to at least about 50% of the particles may be less than approximately 10 microns, or less than approximately 1 micron. The alkaline component may comprise a metal oxide. The alkaline component may be blended with wet powdered activated carbon, and react with the water to thereby assist in drying the powdered activated carbon.

The powdered activated carbon may in part be processed by particle size reduction. The particle size reduction may be accomplished by at least one of milling in a ball mill, or jet milling using a pressurized gas stream, to simultaneously grind, mix and composite the adsorbent composition. The gas may be heated, to also simultaneously dry the adsorbent composition. The adsorbent composition may further comprise a flow agent dispersed on the powdered activated carbon. The flow agent may comprise ultra fine silica particles with a particle size corresponding to at least about 50% of the particles of less than approximately 1 micron. The silica particles may be hydrophobic. The particle size of the powdered activated carbon corresponding to at least about 50% of the particles may be less than approximately 10 microns.

Also featured is an adsorbent composition for removing mercury from a flue gas stream, comprising powdered activated carbon having a flow agent dispersed thereon. The flow agent may be hydrophobic. The flow agent may comprise ultra fine silica particles with a particle size corresponding to at least about 50% of the particles of less than approximately 1 micron. The particle size of the powdered activated carbon corresponding to at least about 50% of the particles may be less than approximately 10 microns.

Further featured is an adsorbent composition for removing mercury from a flue gas stream, comprising powdered activated carbon having a hydrophilic component dispersed thereon. The hydrophilic component may be dispersed on the powdered activated carbon by reaction of reactive components that have been mixed with the powdered activated carbon. The reactive components may comprise sulfanilic acid and sodium nitrite. The hydrophilic component may comprise a sulfonate group.

Still further featured is an adsorbent composition for removing mercury from a flue gas stream, comprising powdered activated carbon having a component dispersed thereon that undergoes an endothermic decomposition at flue gas temperatures. The component may comprise a metal hydroxide, which may be magnesium hydroxide. The component may comprise a metal acetate, which may be calcium magnesium acetate. The component may be alkaline. The component may be water soluble and added to the powdered activated carbon as a solution.

The invention also includes an adsorbent composition for removing mercury from a flue gas stream, comprising powdered activated carbon having a component dispersed thereon comprising a hydrophobic portion that is coupled to the activated carbon and a hydrophilic portion that increases stability in a water-based medium. The hydrophilic portion may comprise a sulfonate group. The dispersed component may comprise a salt of alkyl naphthalene sulfonate. The dispersed component may comprise Aerosol OS™.

The invention also contemplates a method of removing mercury from flue gas resulting from combustion, in which the flue gas is passed through a particle separator, comprising injecting powdered activated carbon into the flue gas at one or more locations before the flue gas reaches the particle separator, and injecting a sacrificial agent into the flue gas at one or more locations before the flue gas reaches the particle separator. The powdered activated carbon and the sacrificial agent may be injected together. The sacrificial agent may be injected closer to the particle separator than is the powdered activated carbon.

BRIEF DESCRIPTION OF THE DRAWINGS

Various other objects, features and advantages of the present invention will become fully appreciated as the invention becomes better understood when considered in conjunction with the accompanying drawings, in which.

DETAILED DESCRIPTION OF EMBODIMENTS OF THE INVENTION

Sorbent Materials

Figure 1:
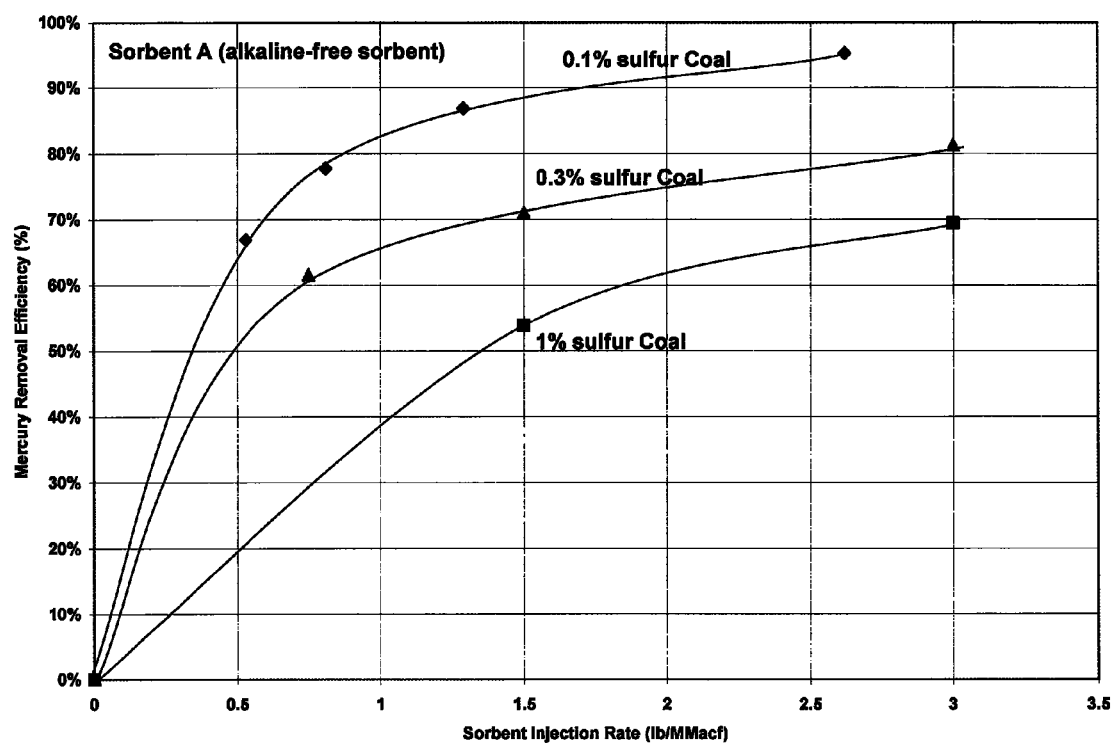
FIG. 1 is a graph showing the effect of sulfur species concentration in the flue gas on the performance of activated carbon mercury sorbents.

It has been discovered that activated carbon performance for mercury removal is diminished with even the slightest amounts of sulfur species in the flue gas, and not only at the highest concentrations of the sulfur species as is commonly reported and understood in the literature and in the industry. FIG. 1 shows the amount of activated carbon required for mercury capture for three coals, with 0.1, 0.3 and 1 percent sulfur. These yielded 80, 160 and 500 ppm $SO_2$ in the combusted flue gas. All three concentrations of $SO_2$ in the flue gas would be considered low and as not impacting the performance of activated carbon. However, these data show that even at low levels, sulfur impacts mercury adsorption by powdered activated carbon.

Halogens are known to catalyze the oxidation of mercury into forms that can be readily adsorbed by activated carbon. Alkaline materials react with $SO_3$ and thereby reduce the deleterious effects of $SO_3$ on mercury uptake by activated carbon. To achieve these advantages, the invention comprises in one aspect sorbent formulations that incorporate halogen and alkaline components. Also, finer particle size compared to commercial standard activated carbons ($d_{50}$—20 to 25 microns) increases mercury adsorption. Smaller particle size enhances mass transfer of the mercury species to the sorbent particle surface, thus increasing the overall rate of capture. The inventive compositions incorporate alkaline components at multiple levels—inside the pores of the carbon; on the surface of the carbon particles; and separate but mixed with the carbon particles.

An embodiment was created starting with powdered activated carbon with a $d_{50}$ of about 24 microns. To this was added a halogen component and, if needed, also an alkaline component. The halogen component can be compounds such as ammonium bromide, a combination of sodium bromide and ammonium bicarbonate, bromine, iodine, ammonium iodide, and a combination of sodium iodide and ammonium bicarbonate. Ammonium bicarbonate acts as a weak base and it also reacts with the sodium bromide to release the halogen An example of the halogen component addition was to use 10 weight percent of the carbon as ammonium bromide, dissolve it in water and mix the solution with the powdered activated carbon.

An example of both a halogen and an alkaline component was to use about 10 weight percent of the carbon as sodium bromide and ammonium bicarbonate each. Make a solution of the ammonium bicarbonate, add the sodium bromide solution to the bicarbonate solution and then add the mixture to the activated carbon. In this example both a halogen and an alkaline component were incorporated within the carbon matrix.

An alkaline component can also be added to the surface of the activated carbon particles to form composite particles. Such an alkaline component can be sodium bicarbonate, sodium carbonate, ammonium carbonate, ammonium bicarbonate, potassium carbonate, potassium bicarbonate, trona, magnesium oxide, calcium oxide, calcium hydroxide, calcium bicarbonate and/or calcium carbonate, for example. This component is added to protect the outside surface of the carbon from the sulfur species in the flue gas. While others have mixed in the alkaline components with the activated carbon, or added it separately in the flue gas (which serves to reduce the sulfur burden in the bulk of the flue gas), in the present invention the alkaline component is added to the activated carbon in such a manner so as to form a composite particle. In this case, each activated carbon particle in the flue gas is effectively impregnated with and surrounded by alkaline salts and/or alkaline particles. This reduces the impact of the sulfur species within and in the immediate vicinity of the activated carbon particle. In this manner, a much smaller amount of the alkaline material is required compared to if the alkaline material was added to reduce the bulk sulfur species concentration. This is particularly important for low sulfur applications where the sulfur species such as $SO_3$ are necessary for other purposes, such as to condition the fly ash for superior collection in an electrostatic precipitator. In fact, in several installations firing low sulfur coal, $SO_3$ is injected into the flue gas in concentrations of around 10 ppm to improve precipitator performance. Such injection of $SO_3$ deteriorates mercury capture performance. The inventive sorbent can be tailored to minimize the effect on bulk $SO_3$ concentrations while simultaneously minimizing the deleterious effect of the $SO_3$ on mercury capture by effectively protecting each activated carbon sorbent particle with an alkaline component.

Such a coating of alkaline particles on the activated sorbent particles may be achieved by mixing the powdered alkaline particles with the activated carbon powder or the halogen-impregnated activated carbon. This may be accomplished in various mixing or blending devices as a ribbon blender or a V-blender.

To minimize the amount of alkaline material required to achieve a desired level of protection from the sulfur species in the flue gas for the activated carbon particles, the alkaline material may be pre-ground to a fine size. The final particle size ($d_{50}$) of alkaline material to be used in the composite is preferably less than 10 microns, more preferably less than 5 microns, and most preferably less than 1 micron. Alternately, fine and ultra-fine alkaline materials such as MgO, or precipitated calcium carbonate may be used. These materials have particle sizes ($d_{50}$) of about 1 micron or smaller. It is to be understood that several alkaline species may be recognized by those skilled in the art which would be suitable for this purpose.

If necessary, the additional alkaline components can also be added as separate particles from the carbon particles. This will serve to reduce the bulk concentration of sulfur species in the flue gas when the combined sorbent is injected into the flue gas.

If CaO or MgO is used as the alkaline material, particularly CaO, the mixing of the halogen salt solution-impregnated carbon with the CaO provides another benefit. CaO will react with the water component of the wet activated carbon to form $Ca(OH)_2$. Since this reaction is exothermic, less energy or no energy may be required to dry the carbon, depending on the amount of CaO and water used. This is particularly beneficial, as the total cost of sorbent production may be significantly reduced To create a batch of sorbent that can be dispersed, but constituted with the composite particles, the mixture as described above can be composited, dried, de-agglomerated and/or reduced in sized by using a jet mill. Hot air supply to the jet mill can perform the additional function of drying. Since this air is also pressurized, it provides the energy in the mill to grind, mix and create the composite particles. The pressurized air stream may be heated to temperature (typically around 650° F.) and fed to a jet mill. Both drying and ultra-fine grinding is achieved simultaneously. The final particle size of the product is preferably below a $d_{50}$ of 15 microns, more preferably below 10 microns and most preferably below 5 microns. Alternately, any other size reduction device such as a ball mill or an agitator mill may be used. The action in all of these devices is to physically bond the alkaline material particles with the activated carbon particles to form composite particles. Simultaneously, the particle size of the composite particles is also reduced. If CaO is used as the alkaline material, the action in the jet mill will serve to further promote the reaction of CaO and moisture thus further decreasing the energy requirements for drying and grinding.

Drying and grinding can also be advantageously and effectively performed in a ball mill.

A typical particle size of the composite product particles that may be expected from the use of a jet mill would be around a $d_{50}$ of 5 to 15 microns. The composite particles have both the functionality of mercury capture and the prevention of the sulfur species from reaching the carbon and poisoning it. Bulk sulfur species concentrations can be reduced by separate sorbent injection. It is to be understood that there are a number of known compositing devices that could be used by those skilled in the art and would be suitable for this purpose.

To ensure the easy re-dispersion of the sorbent particles, a powder dispersion/flow/anti-caking agent can be added to the sorbent mix, preferably before the grinding step. Examples of this agent include ultra-fine silica (20-100 nm) such as Cab-O-Sil™ from Cabot Corp. of Boston, Mass., or Reolosil™ from Tokuyama Corp. of Tokyo, Japan. These are typically added in the amounts of 0.1 to 1 weight percent of the total material being treated. These quantities are sufficient to provide the "anti-caking" properties. Essentially, the finer the size of the anti-caking agent, the lower the quantity of it that is required to achieve the desired property.

Figure 2:
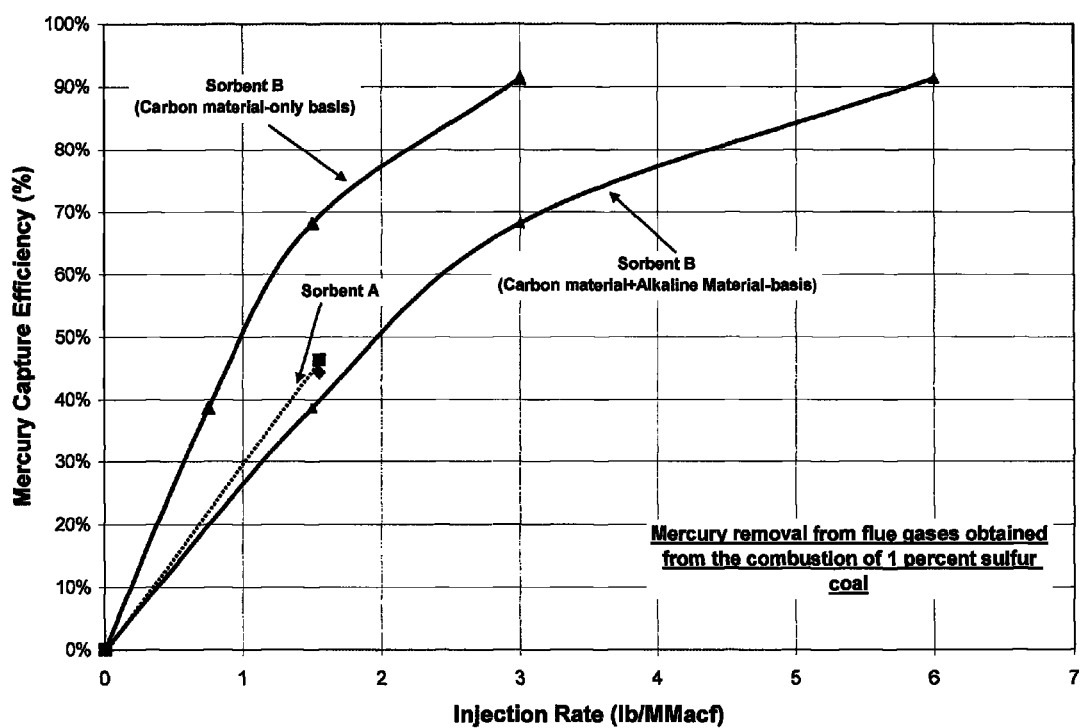
FIG. 2 is a graph showing the effects of an alkaline component on mercury removal performance of powdered activated carbon according to the invention.

An example of the addition of the alkaline species to the carbon and its impact on improving the ability of the carbon to capture mercury is provided below. To activated carbon with the added halogen components as described above sodium bicarbonate was added so that it constituted 20 percent, 50 percent and 80 percent by weight of the final mixture. This mixture was then fed to a jet mill and the product collected in a bag filter. The performance of one of these sorbents (in which the alkaline component of the sorbent was sodium bicarbonate and the alkali carbonate component in the final sorbent mixture was 50 percent) is shown in FIG. 2. The lower curve reflects the actual data, while the upper curve is a re-calculation based on the amount of carbon present in the injected sorbent. The middle curve is a control injection of Sorbent A (no alkaline material). Thus, for example, the mercury capture is increased from 45 percent to 70 percent for the same total amount of carbon injected (about 1.6 lb/MMacf), or alternately only half the amount of carbon (0.8 instead of 1.6 lb/MMacf) is required to achieve a prescribed degree of mercury capture (45 percent).

Several combinations are possible to those skilled in the art from these teachings, and all are within the scope of the invention. For example, it might be advantageous only to add the halogen component and the anti-caking agent and perform the jet mill drying/grinding to create a sorbent formulation. An example is Sorbent A, described below. Alternatively, all of the components may be added—a halogen component, an alkaline component, anti-caking agent and then the drying/size reduction/compositing step performed. An example is Sorbent B, also described below. The drying step and the grinding step could be performed simultaneously such as by supplying hot pressurized air to a jet mill. Alternately, hot pressurized steam could be supplied and used as the energy source for drying and grinding. The drying and grinding step could be performed sequentially, such as drying the material in a separate atmospheric drying system followed by grinding using pressurized gas in a jet mill. Drying and grinding can also be advantageously performed in a ball mill using hot gas or hot air.

Any combination of the ingredients and process steps described herein may be performed in any order to create functionally advantageous sorbents for a given application. Examples of sorbent formulations in accordance with the invention are set forth elsewhere.

Concrete-Friendly Sorbents and Fly Ash Containing Such Sorbents

Activated carbon, halogenated activated carbon, or other carbonaceous sorbents are injected into combustion-derived gases for the purpose of using them as sorbents for removing mercury from those gases. The injected carbonaceous sorbent, with the removed mercury adsorbed thereon, is collected in particulate removal devices such as electrostatic precipitators or bag filters along with the fly ash (inorganic residues from the combustion of coal or other ash-bearing fuel). This fly ash, along with water, cement, sand (and optionally other cementitious components) and an air entrainment agent (and optionally other concrete chemical admixtures) and air are mixed to form air-entrained concrete. With the presence of carbonaceous components in the fly ash, particularly high surface area materials such as activated carbon, there are significant air entrainment problems. The carbon materials adsorb or react with the air entrainment agent(s), thereby neutralizing or diminishing the functionality of such agents and consequently reducing the uptake of air in the concrete mixture. Too little or excessive dosages of the air entraining agents can lead to a poor concrete product, because the quantities of the detrimental carbonaceous components in the fly ash are not known exactly and can vary greatly.

Prior art methods to modify the carbon surface (by increasing its hydrophilic nature) to reduce the uptake of the air entraining agents (minimize the impact on the foam index) also detrimentally impact the mercury capture ability of the carbon. For example, ozonation of the activated carbon, while reducing foam index impacts, also reduces its mercury capturing ability and reactivity.

Prior art methods have also used "sacrificial" agents to counter the impact of the carbon components on the foam index of the fly ash material. In these methods, the sacrificial agent is added to the ash during (or prior to) its use in concrete manufacturing. One of the main problems with these sacrificial agents is that without a measure of the quantity of the carbonaceous material in the ash and the magnitude of its detrimental impact, an exact amount of the "sacrificial" agent or the air entraining agent to be used in the concrete manufacturing step cannot be determined.

It is an object of one aspect of this invention to provide a composition of material that will have a high mercury capturing ability and also not substantially impact the fly ash in terms of its use in concrete, from an air entrainment perspective. Another aspect of this invention is to provide a method of using materials.

Concrete-friendly sorbents of the invention, where the fly ash is to be used for concrete and where the mercury sorbent ends up with the ash, may be constituted in the following manner. In one embodiment, sulfonate groups are added to the surface of the powdered activated carbon through reaction at the carbon surface. One example uses sulfanilic acid (1 to 10 percent by weight of the carbon) that is added to the carbon and mixed/blended. To this mixture a solution of sodium nitrite is added. For example if 4 gms of sulfanilic acid is added to 100 gms of carbon, a solution with 1 gm of sodium nitrite would need to be used. The mixture is blended and allowed to react for several minutes. Using a hot solution of sodium nitrite (for example, a solution at 80° C.) would speed up the reaction between the carbon, sulfanilic acid and sodium nitrite. Keeping all the reaction components at the elevated temperature would also speed up the reaction. This reaction adds a hydrophilic component to the carbon surface which reduces the adsorption of air entraining agents. Such treated carbons can be further treated in the manner described before (the addition of halogen components, alkaline components, flow agents and/or compositing). A detailed example of such a formulation is Sorbent C, described below.

While the introduction of sulfonate groups on the carbon surface makes the carbon more hydrophilic, it also reduces the activity of the sorbent towards mercury capture. An alternate way of maintaining the mercury adsorption activity of the sorbent while reducing the impact of the sorbent on the foam index of the fly ash when the sorbent is mixed with the fly ash is to add, either along with the powdered activated carbon or dispersed on the powdered activated carbon, a material (sometimes referred to herein as a "sacrificial agent") that preferentially occupies the surface of the carbon when present in the concrete mixture. This allows the air entraining agents to be not adsorbed by the carbon, thus allowing the air entraining agents that are added to the concrete mixture to play their original role. An example of such a material is sodium methyl naphthalene sulfonate. Other examples are phenyl glycol ethers. A third example is polynapthalene sulfonate. A fourth example is sodium/calcium lignosulfonate. All of these agents have a hydrophobic component (organic portion) and a hydrophilic component (sulfonate group). The hydrophobic portion attaches to the carbon and prevents the air entraining agents from being adsorbed, while the hydrophilic component makes the powdered activated carbon stable in a water-based concrete mixture. These materials may be added to the sorbent in effective amounts (typically in the range of about 5 to about 300 percent of the carbon sorbent).

Other Concrete-Friendly Sorbent Materials that Minimize Foam Index Impacts

One can determine the quantity of sacrificial agent required to neutralize the negative impact of the carbonaceous mercury sorbent on air entrainment, by performing foam index measurements of various mixtures of carbonaceous mercury sorbent and sacrificial agent with fly ash, air entraining agent and other components in concrete manufacturing. In this manner the proportion of carbonaceous mercury sorbent and sacrificial agent can be determined accurately.

A mixture of carbonaceous mercury sorbent and sacrificial agent in the above proportion can be prepared and used as the "concrete-friendly" mercury sorbent.

Since the two materials (carbonaceous mercury sorbent and sacrificial agent) are expected to be injected into the combustion gases, which are present at temperatures well above ambient, the thermal stability of the individual components is critical. The sacrificial agent should be thermally stable under the treatment conditions. Typical flue gas temperatures in the coldest zone prior to particulate removal are in the range of 110 to 170° C. A characteristic of the sacrificial agent that can be used in the invention is good thermal stability. Thermal stability is defined as the ability to perform with respect to neutralizing the negative impact of the carbonaceous mercury sorbent on air entrainment, after being exposed to flue gas temperatures (around 150° C.). A preferred sacrificial agent, both for its efficacy in the cement and its thermal stability, is Aerosol-OS, which is an anionic surfactant available as a free-flowing powder. The active surfactant material is sodium di-isopropyl naphthalene sulfonate (75% weight), and is mixed with an inorganic salt; about 20 percent by weight of sodium sulfate. It has a melting point of 205° C., a flash point well above 100° C., and a composition that does not promote spontaneous combustion leading to very superior auto-ignition characteristics.

Other sacrificial agents include other salts of alkyl naphthalene sulfonates (methyl, n-butyl, sec-butyl, nonyl). These may be used subject to their thermal stability relative to the location(s) in the flue gas at which they are injected, either separately or together with the composited powdered activated carbon.

Ethylene glycol phenyl ether (EGPE) is another example of a relatively stable sacrificial agent. EGPE has a boiling point of 245° C., a low vapor pressure (0.0013 kPA at 20° C.), a flash point of 127° C. and an auto-ignition temperature of 500° C.

Another characteristic of the sacrificial agent that can be used in the invention is it ability to be dispersed into the flue gas. Material in a powder form is preferred, that can be injected and dispersed into the gas. It is preferred that the size distribution of the sacrificial agent is similar to the carbonaceous mercury sorbent.

Since EGPE is a liquid, it is best introduced by adsorbing it onto a substrate such as powdered clay like bentonite.

Another characteristic of the sacrificial agent that can be used in the invention is its propensity to be removed from the flue gas and collected in a particulate control device such as precipitator or fabric filter. In particular, collection in a precipitator is important, as some particles may not be effectively collected if they are not charged easily.

The sodium sulfate component in Aerosol-OS is useful in this regard, as it is effectively removed in a precipitator and by its physical attachment to the sodium di-isopropyl naphthalene sulfonate enables its co-removal in a precipitator.

When Aerosol-OS was added to the carbonaceous mercury sorbent and a mixture prepared (Sorbent E), it was determined that it had a detrimental effect on the mercury capturing ability of the carbonaceous sorbent. Aerosol-OS could be advantageously coated, for example with ultra-fine silica to prevent caking and minimize the physical blockage of the pores of the carbonaceous sorbent when it is mixed with the sacrificial agent.

Methods of Use of the Sacrificial Agent:
(i) Inject carbonaceous mercury sorbent upstream of sacrificial agent separately—particularly advantageous when carbonaceous mercury sorbent's mercury capture ability is enhanced by its injection at higher temperatures or upstream in the process train, which also serves to provide longer residence time for reaction.
(ii) Inject carbonaceous mercury sorbent together with the sacrificial agent—particularly advantageous because a single injection system for both components can be used.

The invention includes powdered activated carbon sorbent for mercury capture that reduces the impact of the sorbent on the foam index of the fly ash. This can be achieved by adding a sacrificial agent/adsorbate to the sorbent particles, prior to injection into the flue gas. Then, inject the combined material into the flue gas upstream of a particulate collection device. In this manner the combined material is collected along with the fly ash. Because of the close physical association of the sacrificial agent particles and the carbon particles (within the sorbent material), they preferentially end up together in the fly ash.

Another important consideration with respect to the sacrificial agent is the required stability of the compound when subjected to flue gas temperatures.

One example of a stable and active sacrificial agent is sodium di-isopropyl naphthalene sulfonate (available as Aerosol OS™ manufactured by Cytec Industries, West Paterson, N.J.). In this case, a concrete-friendly sorbent would comprise activated carbon mixed with sacrificial agent such as sodium di-isopropyl naphthalene sulfonate (Aerosol OS). The activated carbon to be used can be untreated (plain), or impregnated with halogen additives, or impregnated with halogen additives and mixed/coated with alkaline species such as magnesium hydroxide.

Use of Sorbents

The inventive sorbents may be advantageously used for mercury capture by injecting them upstream of a particulate collection device. It is understood that longer contact times between the sorbent and the flue gas are advantageous for mercury capture. Hence, injection at locations that maximize the contact time, while still preserving the integrity of the sorbent, is desirable. Such injection locations would be at gas temperatures approximately below 1100° F. Physically, this would be within the economizer, or downstream of the economizer (i.e. before an air heater) in coal-fired power plant. Injection both downstream or upstream of a selective catalytic reactor unit and upstream of an air heater would also be advantageous. If a hot-side precipitator is present, injection upstream of the hot-side precipitator is recommended. Alternately, the sorbents may be injected at lower temperatures for reasons of preserving sorbent integrity. Such a location may be after the air pre-heater in a coal-fired power plant.

Activated carbon performance for mercury capture is enhanced with the addition of appropriate halogen compounds (such as ammonium bromide, bromine, hydrogen bromide, ammonium bicarbonate/sodium bromide) to the carbon, prior to its injection into the mercury-bearing flue gas which has low concentration of halogen species (HCl, HBr, or HF). It has also been discovered that incorporation of an alkaline component with the (halogen-impregnated) activated carbon particle enhances the performance of the carbon with respect to mercury capture, particularly with flue gases having sulfur species (especially $SO_3$). A particularly advantageous choice of this alkaline component is magnesium hydroxide, which undergoes thermal decomposition to MgO and $H_2O$.

The use of magnesium hydroxide as an added material also serves to meet the objective of preventing the carbon from getting to too high a temperature during the injection process. Magnesium hydroxide undergoes endothermic decomposition with water release at 630° F.

(332° C.). The endothermic decomposition of $Mg(OH)_2$ is its flame retardant mechanism. For combustion to occur, there must be fuel, oxygen and heat. By absorbing some of the heat, magnesium hydroxide prevents or delays ignition and retards combustion of the carbon. The water released during decomposition has the effect of diluting the combustible gases and acting as a barrier, preventing oxygen from supporting the flame.

It was also discovered that sorbent containing MgO/Mg$(OH)_2$ has beneficial effects with respect to foaming index. U.S. Pat. No. 4,257,815 discloses an improved process and composition of matter which will increase the ability of concrete with fly ash containing carbon and an air entraining agent, to entrain air necessary to reduce freeze/thaw scaling problems. Briefly, the indicated process included the step of mixing the fly ash containing carbon with an alkaline earth oxide in a form immediately available to inhibit the air absorptive properties of the carbon in the fly ash. The alkaline earth oxides are chosen from a group containing calcium oxide, magnesium oxide, calcium hydroxide, magnesium hydroxides or waste dusts that contain calcium or magnesium oxides or hydroxides.

In the invention, one example is the addition of ultra-fine $Mg(OH)_2$ to the carbon particles to coat the particles. When the sorbent is introduced into the flue gas to capture mercury at temperatures around 600° F., the $Mg(OH)_2$ will undergo decomposition to form MgO. When introduced at lower temperatures, such as 300° F., it will remain in the hydroxide form. But since it is introduced as a composite part of the carbon particles, it will be in close proximity to the carbon, thus ameliorating the effect of carbon on adsorbing air entraining agents, when the carbon-fly ash mixture is used for concrete manufacturing. Examples of materials that can be used for coating for such purposes include calcium oxide, magnesium oxide, calcium hydroxide, magnesium hydroxides or waste dusts that contain calcium or magnesium oxides or hydroxides. It is preferred that ultra-fine particle of these materials be used (size less than 10 microns, preferably less than 5 microns, and more preferably less than 1 micron).

An example of the inventive sorbent material manufactured with the above features is Sorbent D. The base material used was powdered activated carbon (typically 90% smaller than 44 micron, $d_{50}$~22 microns). The halogen component used was ammonium bromide. The alkaline component used was magnesium hydroxide. Advantageously, ultra-fine magnesium hydroxide may be used with a mean particle size $(d_{50})$~1 micron. An example of such a material is MagShield-UF™, from Martin Marietta Magnesia Specialties, Baltimore, Md.

A continuous blender [Scott Equipment, New Prague, Minn. Model High Speed Blender—HSB] was used for mixing the activated carbon particles, ammonium bromide solution and magnesium hydroxide. A 3" screw was used to bring dry activated carbon from ground level to the mixer feeder, which fed the HSB-A at a predetermined feed rate of about 2,000 lbs/hr. A 20% ammonium bromide/water solution was pumped through nozzles mounted to the HSB-A. Magnesium hydroxide was fed using a volumetric screw feeder mounted between the discharge of HSB-A and inlet of HSB-B. HSB-B blended the magnesium hydroxide and salt-impregnated activated carbon. The blended material was discharged into an elevated 9" screw, which then discharged into 55-gallon drums. The finished blended material ranged from 20%-36% moisture. It is believed that the ultra-fine magnesium hydroxide particles coated the powdered activated carbon.

The next step was drying. A Scott Equipment AST Dryer was used for this step. Hot flue gas from a gas burner at temperatures ranging from 700 to 1300° F. was used to drive the moisture from the wet material. A final product moisture content of less than 2 percent was achieved. A discharge flue gas temperature of about 325° F. was needed to drive off moisture to approximately 1% moisture. Using an inlet temperature of 1000° F.+, production rates were increased to 1,100 dry lbs/hr. The dried material product temperature was recorded at 212° F. to 228° F. The dried material product, along with the drying gases, was directed to a bag-house, where the dried material was captured and the clean gases discharged. The dried material was augured from the baghouse to bulk super-sacks and stored.

Sorbent D may be advantageously used for mercury capture by injecting it upstream of a particulate collection device. It is understood that longer contact times between the sorbent and the flue gas are advantageous for mercury capture. Hence, injection at locations that maximize the contact time, while still preserving the integrity of the sorbent, is desirable. Such injection locations would be at gas temperatures approximately below 1100° F. Physically, this would be within the economizer or downstream of the economizer (i.e. before an air heater) in a coal-fired power plant. Injection both downstream or upstream of a selective catalytic reactor unit and upstream of an air heater would also be advantageous. If a hot-side precipitator is present, injection upstream of the hot-side ESP is recommended. Alternately, the sorbent may be injected at the lower temperatures for reasons of preserving sorbent integrity. Such a location may be after the air preheater in a coal-fired power plant.

Additional improvements in performance may be obtained by reducing the particle size of the sorbent from standard size $(d_{50}$~22 microns) to finer sizes, preferably smaller than 15 microns $(d_{50})$, more preferably smaller than 10 microns $(d_{50})$. This size reduction can be done prior to injection during the manufacturing process. In this method it might be advantageous to add flow aids (e.g., the ultra-fine silica) to prevent clumping and aid dispersion. Alternately, the size reduction may be performed in situ just prior to injection into the flue gas, using a jet mill.

Additional Examples of the Inventive Material, and Test Results

Examples of the Formulation and Production of Each of Sorbents A-F are as Follows.

Sorbent A and A*:

Bituminous coal-derived activated carbon with an Iodine Number of about 800 was used as the base material. This material was pre-ground to a fine size so that 95% of the material is smaller than about 45 microns. Carbon amount used was 1000 gm. Technical grade ammonium bromide (70 gm) was dissolved in water (600 ml) at room temperature. The solution was added to the carbon while blending to get uniform wetting. About 10 gm of Cab-O-Sil (M-5) hydrophilic ultra-fine silica obtained from the Cabot Corporation was added to the wetted carbon and blended. The entire mixture was dried to about 1% moisture. The dried mixture was subsequently ground in an alumina-lined micro jet mill with grinding air pressure of 100 psi. Feed rate was adjusted to achieve a final product quality with the following size parameters ($d_{50}$=5 to 7 microns, $d_{90}$=15-20 microns), where $d_{50}$ and $d_{90}$ are the diameters through which 50% and 90% of the sample pass through respectively. Sorbent A* was prepared in a similar manner to Sorbent A except with a lignite-derived activated carbon with an Iodine Number of about 550.

Sorbent B:

Bituminous coal-derived activated carbon with an Iodine Number of about 800 was used as the base material. This material was pre-ground to a fine size so that 95% of the material is smaller than about 45 microns. Carbon amount used was 1000 gm. Technical grade ammonium bromide (70 gm) was dissolved in water (600 ml) at room temperature. The solution was added to the carbon while blending to get uniform wetting. To this 1100 gm of sodium bicarbonate was added with continued blending, to get a uniform mixture. About 10 gm of Cab-O-Sil (M-5) hydrophilic ultra-fine silica obtained from the Cabot Corporation was added to the wetted carbon and blended. The entire mixture was dried to about 1% moisture. The dried mixture was subsequently ground in an alumina-lined micro jet mill with grinding air pressure of 100 psi. Feed rate was adjusted to achieve a final product quality with the following size parameters ($d_{50}$=5 to 7 microns, $d_{90}$=15-20 microns), where $d_{50}$ and $d_{90}$ are the diameters through which 50% and 90% of the sample pass through respectively.

Sorbent C:

Bituminous coal-derived activated carbon with an Iodine Number of about 800 was used as the base material. Carbon amount used was 1000 gm. 100 gm of technical grade sulfanilic acid, obtained from Nation Ford Chemical, Fort Mill, S.C. was added to the carbon and blended. This material was pre-ground to a fine size so that 95% of the material is smaller than about 45 microns.

Technical grade ammonium bromide (70 gm) was dissolved in water (600 ml) at room temperature. The solution was added to the carbon while blending to get uniform wetting. About 50 gm of Cab-O-Sil (M-5) hydrophilic ultra-fine silica obtained from the Cabot Corporation was added to the wetted carbon and blended. The entire mixture was dried to about 1% moisture. The dried mixture was subsequently ground in an alumina-lined micro jet mill with grinding air pressure of 100 psi. Feed rate was adjusted to achieve a final product quality (carbon-sulfanilic acid mixture) with the following size parameters ($d_{50}$=5 to 7 microns, $d_{90}$=15-20 microns), where $d_{50}$ and $d_{90}$ are the diameters through which 50% and 90% of the sample pass through respectively. 1200 grams of sodium bicarbonate powder was also ground to $d_{50}$=5 to 7 microns in an alumina-lined micro jet mill. A solution of sodium nitrite was prepared by mixing 35 gm of sodium nitrite in 400 ml of water. The sodium nitrite solution was added to the carbon-sulfanilic acid mixture and blended for 15 minutes. 100 grams of ammonium bromide was added to 200 ml of water and the ammonium bromide solution then added to the above wet mixture. Finally, the pre-ground sodium bicarbonate was added and blended, followed by the addition of 12 grams of Cab-O-Sil (M-5), obtained from Cabot Corporation. The entire material was dried to less than 1% moisture in a flash dryer, which ensures that the particles are de-agglomerated.

Sorbent D:

Lignite-derived activated carbon with an Iodine Number of about 550 was used as the base material. This material was pre-ground to a fine size so that 95% of the material is smaller than about 45 microns. Carbon amount used was 1000 gm. Technical grade ammonium bromide (70 gm) was dissolved in water (600 ml) at room temperature. The solution was added to the carbon while blending to get uniform wetting. About 50 gm of Cab-O-Sil (TS-530) hydrophobic ultra-fine silica from the Cabot Corporation was added to the wetted carbon and blended. About 600 gm of magnesium hydroxide (MagShield-UF from Martin Marietta Magnesia Specialties, with a typical median particle size smaller than 1 micron) was added to the above wet carbon material and blended. The entire mixture was dried to about 1% moisture. The dried mixture was subsequently ground in an alumina-lined micro-jet mill with grinding air pressure of 100 psi. Feed rate was adjusted to achieve a final product quality with the following size parameters: $d_{50}$=5 to 7 microns, $d_{90}$=15-20 microns, where $d_{50}$ and $d_{90}$ are the diameters through which 50% and 90% of the sample pass through, respectively.

Sorbent E:

Lignite-derived activated carbon with an Iodine Number of about 550 was used as the base material. This material was pre-ground to a fine size so that 95% of the material is smaller than about 45 microns. Carbon amount used was 1000 gm. Technical grade ammonium bromide (70 gm) was dissolved in water (600 ml) at room temperature. The solution was added to the carbon while blending to get uniform wetting. About 16 gm of Reolosil (QS-20) hydrophilic ultra-fine silica obtained from the Tokuyama Co. Ltd. was added to the wetted carbon and blended. The entire mixture was dried to about 1% moisture. The dried mixture was subsequently ground in an alumina-lined micro-jet mill with grinding air pressure of 100 psi. Feed rate was adjusted to achieve a final product quality with the following size parameters: $d_{50}$=5 to 7 microns, $d_{90}$=15-20 microns, where $d_{50}$ and $d_{90}$ are the diameters through which 50% and 90% of the sample pass through respectively. About 250 gm of Aerosol-OS surfactant (sodium di-isopropyl naphthalene sulfonate) obtained from Fitzchem Corporation and manufactured by Cytec Industries was added to the prepared carbonaceous sorbent and blended to make the final product.

Sorbent F:

Lignite-derived activated carbon with an Iodine Number of about 550 was used as the base material. This material was pre-ground to a fine size so that 95% of the material is smaller than about 45 microns. Carbon amount used was 1000 gm. Technical grade ammonium bromide (70 gm) was dissolved in water (600 ml) at room temperature. The solution was added to the carbon while blending to get uniform wetting. About 50 gm of Cab-O-Sil (TS-530), a hydrophobic ultra-fine silica obtained from the Cabot Corporation was added to the wetted carbon and blended. The entire mixture was dried to about 1% moisture. The dried mixture was subsequently ground in an alumina-lined micro jet mill with grinding air pressure of 100 psi. Feed rate was adjusted to achieve a final product quality with the following size parameters ($d_{50}$=5 to 7 microns, $d_{90}$=15-20 microns), where $d_{50}$ and $d_{90}$ are the diameters through which 50% and 90% of the sample pass through respectively.

Results from Testing of Examples of the Inventive Material:

Foam Index Testing:

Sorbent A, and mixtures of Sorbent A and Aerosol-OS were subjected to foam index testing, with and without sample heating. A sorbent-containing fly ash sample was prepared by mixing 10 mg of carbon with 1 gm fly ash from a Powder River Basin (PRB) coal. The PRB coal-derived ash has practically no inherent unburnt carbon (<0.2%). This resulted in sorbent-ash sample with approximately 1 weight percent activated carbon sorbent. To the sorbent-ash sample (with and without the sacrificial agent), 8 gm of cement was added and foam index measurements were carried out using an appropriately prepared air entraining agent solution (15% solution of Darex II and distilled water, Darex II was obtained from W.R. Grace Industries, Cambridge, Mass.). The following results were obtained on the number of drops required before stable foam was formed.

| Material | Drops required |
| --- | --- |
| 8 gm cement | 10 drops |
| 8 gm cement + 1 gm sorbent-ash | 22 drops |
| 8 gm cement + 1 gm sorbent-ash + 2 mg Aerosol-OS | 12 drops |
| 8 gm cement + 2 gm sorbent-ash + 4 mg Aerosol-OS | 16 drops |
| 8 gm cement + 2 gm sorbent-ash + 5 mg Aerosol-OS | 12 drops |

The effect of heating was obtained by subjecting the Aerosol-OS to approximately 200° C. in air for 1 hour and then using it with the activated carbon in the foam index measurements. The following results were obtained.

| Material | Drops required |
| --- | --- |
| 8 gm cement | 10 drops |
| 8 gm cement + 1 gm sorbent-ash | 22 drops |
| 8 gm cement + 1 gm sorbent-ash + 2 mg Aerosol-OS (heated) | 12.5 drops |
| 8 gm cement + 1 gm sorbent-ash + 3 mg Aerosol-OS (heated) | 8 drops |

Based on the above data, two objectives were achieved simultaneously—the foam index of the sorbent-ash mixture was decreased from a marginal or close to unacceptable level of 22 drops to acceptable values—between 8 and 12.5 drops. This was achieved with the addition of sodium di-isopropyl naphthalene sulfonate to the activated carbon sorbent. This material (sacrificial agent) was stable even at high temperatures up to 200° C. —indicating that it can be used (with the activated carbon) for injection in coal-fired power plants with cold-side ESP or fabric filters which typically operate below 350° F. or 170° C.

Comparison of Impact of Inventive Materials on Foam Index Measurements:

Foam index measurements were carried for two samples of the inventive material in the following manner.

60 ml of distilled water was placed into a 250-ml jar. 30 g of fly ash sample was added. After closing the jar with a lid, the jar was shaken for 15 seconds. Air entraining agent solution was prepared by diluting 1 part resin to 30 parts distilled water. Commercially available Vinsol Resin™ (Darwin Chemical Company, Plantation, Florida) was used as the air entraining agent. The prepared Vinsol resin solution was added to the jar in increments of 5 drops. The jar was then closed and shaken for 15 seconds, and then observed for stable foam. The end point was noted when the foam remained stable after two 15-second shaking periods with no resin solution added. Addition of about 50 drops of the solution is considered as an acceptable level of air entraining agent use.

The following results were noted for the various samples. Fly ash was obtained from the combustion of a U.S. low-sulfur sub-bituminous coal from the Powder River Basin and was used as the baseline (control). Various amounts of carbonaceous sorbent (Sorbent A or Sorbent C or Sorbent B) were added to the fly ash to yield differing quantities of additional carbon in the ash-sorbent mixture. These were then tested for their foam index characteristics.

TABLE I

| | Sample | % Carbon in Sample from Sorbent | Drops | Delta Drops |
| --- | --- | --- | --- | --- |
| 1 | Fly ash only (Baseline) | 0 | 25 | 0 |
| 2 | Fly ash + Sorbent A | 0.08 | 40 | 15 |
| 3 | Fly ash + Sorbent A | 0.14 | 55 | 30 |
| 4 | Fly ash + Sorbent A | 0.27 | 85 | 60 |
| 5 | Fly ash + Sorbent A | 0.4 | 95 | 70 |
| 6 | Fly ash + Sorbent C | 0.105 | 30 | 5 |
| 7 | Fly ash + Sorbent C | 0.155 | 30 | 5 |
| 8 | Fly ash + Sorbent C | 0.26 | 55 | 30 |
| 9 | Fly ash + Sorbent B | 0.045 | 30 | 5 |
| 10 | Fly ash + Sorbent B | 0.145 | 50 | 25 |
| 11 | Fly ash + Sorbent B | 0.22 | 65 | 40 |

Figure 3:
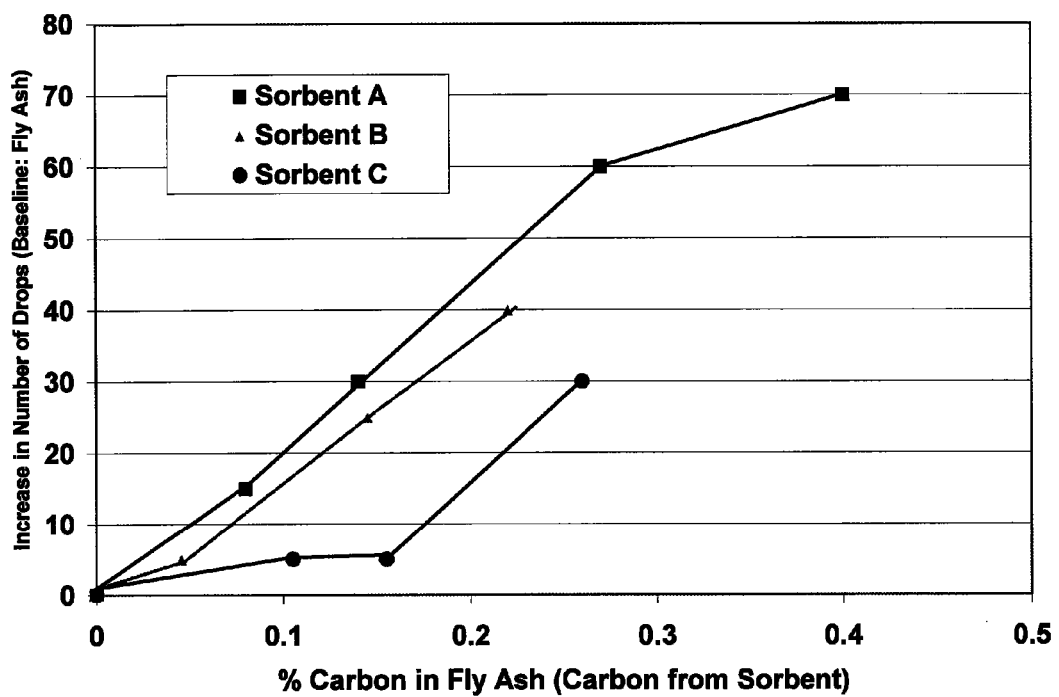
FIG. 3 is a graph of results of foam index measurements of fly ash mixed with several of the inventive sorbents.

The results show the improvement in the foam index characteristics of Sorbent B compared to Sorbent A. The performance of Sorbent C was better than both Sorbent A and Sorbent B. The same data is illustrated in the FIG. 3.

Performance of Sorbent A*, Sacrificial Agent and Sorbent E on Mercury Capture and Foam Index Measurements Mercury removal performance of examples of the inventive sorbents was tested in a pilot-scale coal-fired furnace. This pilot-scale furnace burns pulverized coal and is equipped with air-cooled and water-cooled heat exchangers to simulate the temperature profile of a full-scale coal-fired boiler. The flue gas from the furnace after passing through the heat exchangers is sent to a tubular pilot-scale electrostatic precipitator (ESP), which serves as the particulate cleanup device. Typically, the pilot electrostatic precipitator was operated at 320° F.

Sorbent was injected into the flue gas upstream of the electrostatic precipitator (ESP). The temperature of the flue gas was approximately 300-350° F. at the ESP. The duct leading to the electrostatic precipitator was slightly heated to compensate for heat loss to the surrounding and to maintain the flue gas temperature entering the ESP. The ESP was also heated to maintain more or less a constant flue gas temperature leaving the ESP. Mercury concentrations were measured upstream of the sorbent injection point and downstream of the ESP, after the fly ash (with the sorbent) was removed.

Baseline fly ash was collected without sorbent injection for use as a control for foam index measurements. Fly ash obtained during sorbent injection was collected from the ESP hopper to determine the foam index of these samples and to ascertain if any deterioration of the fly ash had occurred with respect to its foaming index, due to sorbent injection.

A U.S. sub-bituminous Powder River Basin coal with low chlorine content was fired in this experiment. The carbon content of the fly ash without sorbent injection was very low, typically below about 0.5%. These low carbon levels in the baseline fly ash resulted in low foaming index values, indicating compatibility for use in concrete applications. Typical mercury concentrations in the flue gas before sorbent injection and upstream of the pollution control system was about 9 $\mu g/m^3$. Mercury concentration reduction from these levels with sorbent injection is shown in Table below.

Foam index testing was performed on fly ash samples which were collected in the ESP, with and without sorbent injection. All samples were titrated three times, and their results are averages of the data. The blank value used for Portland cement in the test was 100 μL or two 50-μL drops;

the common convention of 50 µL per drop was used for calculations. The foam index values indicate the additional amount of air entraining agent (AEA) required by a 20% addition of ash to the standard sample of Portland cement. The AEA used was a 10% solution (v/v) AEA-92. This product is sodium olefin sulfonate with a small amount of 4-chloro-3-methyl phenol added. This product is manufactured by Euclid Chemical Company, Cleveland, Ohio.

TABLE II

| Sample | Sorbent Type | Injection Rate (lb/MMacf) | Inlet Hg ($\mu g/m^3$) | Outlet Hg ($\mu g/m^3$) | Injection Location | Foam Index Measurement µL Surfactant (blank subtracted) |
|---|---|---|---|---|---|---|
| 1 | Baseline Fly Ash (no sorbent injection) |  | 9.2 | 7.8 | — | 0 |
| 2 | Sorbent A* | 3.0 | 9.2 | 2.65 | 360F | — |
| 3 | Sorbent E | 3.0 | 9.2 | 4 | 360F | −100 |
| 4 | Sorbent A* + Aerosol-OS | 3.0/ 0.75 | 9.2 | 2.4 | 360F | 0 |

Samples 1 and 4 required the same amount of surfactant as the cement blank while Sample 3 appeared to foam upon addition of water, indicating that something in the samples was acting like a surfactant or that something present reduced surface tension in the solution. The foam that was present in all the samples was quite stable.

As shown in Table II, injection of Sorbent E improved the foam index levels of the collected fly ash compared to the baseline fly ash with no sorbent injection. With the injection of Sorbent A* and Aerosol-OS, the foam index level of collected fly ash was similar to that of the baseline fly ash with no sorbent injection. No data is available for injection of Sorbent A* in the flue gas, although from an understanding of the prior art, it is anticipated that the foam index value of the collected fly ash with the injection of this carbonaceous sorbent will be degraded.

Table II also provides the mercury capture performance of the various sorbents. The separately located injection of Aerosol-OS and Sorbent A* into the flue gas did not detrimentally affect the performance of the mercury sorbent (Sorbent A*). Outlet mercury concentration was 2.4 µg/m³ with the injection of the two materials compared to 2.65 µg/m³ with the injection of Sorbent A* alone. However, the injection of Sorbent E (which is a physical mixture of Sorbent A* and Aerosol-OS) provided a poorer mercury capture performance compared to Sorbent A, suggesting that the sacrificial agent (Aerosol-OS) was physically blinding the mercury sorbent.

Other sacrificial agents can be combined with the mercury sorbent and used together as one material to reduce the impact on the foam index of fly ash with the carbonaceous mercury sorbent.

It may also be advantageous to inject the mercury (carbonaceous) sorbent separately at a higher temperature or upstream of the location where the sacrificial agent is injected into the flue gas. In this case, both improved mercury capture performance and foam index values would be obtained.

Comparison of Impact of Sorbents A, B and C on Mercury Removal

Figure 4:
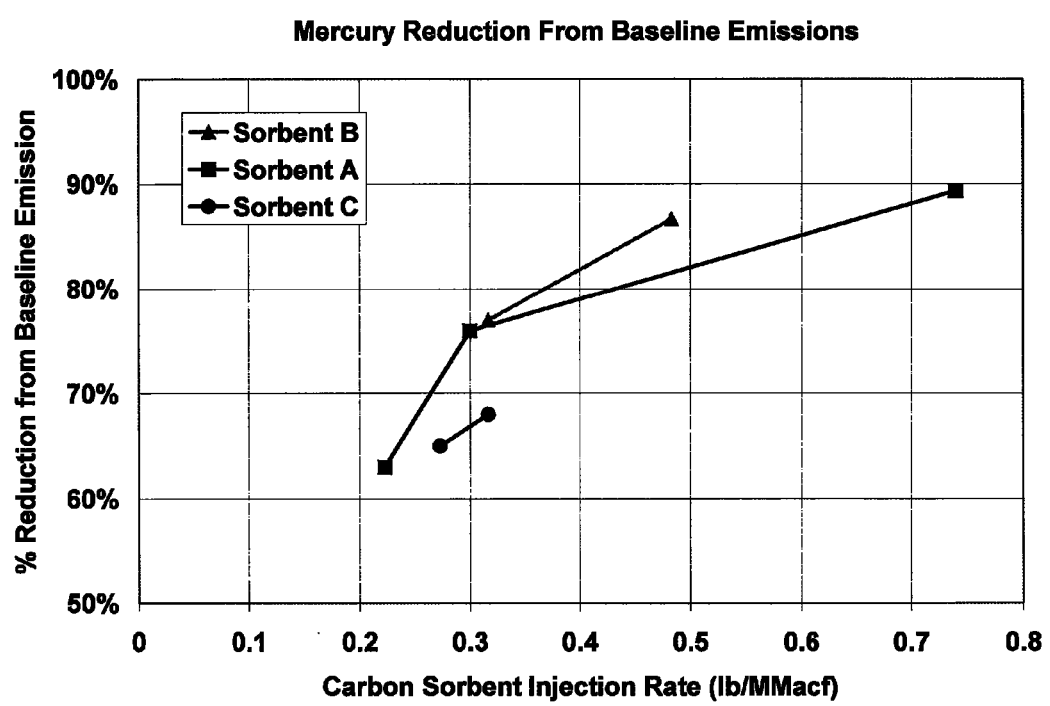
FIG. 4 is a graph detailing mercury reduction from baseline emissions via inventive sorbents.

Mercury removal performance of certain of the examples of the inventive sorbents was also tested in a coal-fired boiler. This boiler was equipped with an air heater, an electrostatic precipitator and a wet flue gas desulfurization scrubber. Sorbent was injected into the flue gas upstream of the electrostatic precipitator. A sub-bituminous Powder River Basin coal was fired in the boiler. The carbon content of the fly ash without sorbent injection was very low, typically below about 0.25%. Typical mercury concentrations in the flue gas before sorbent injection and upstream of the pollution control system was about 11-14 µg/m3. These were reduced approximately to 6 µg/m³ with the existing pollution control devices. Additional removal with sorbent injection is shown in FIG. 4.

Sorbent injection rates are provided in pounds of sorbent injected per million actual cubic feet of flue gas (lb/MMacf).

Sorbent B with the addition of the alkaline material to the carbonaceous material performed slightly better than the other sorbents with respect to mercury reduction. Sorbent B has improved performance on both categories of mercury removal (improved) and foam index (reduced impact).

Sorbent C did not perform as well as the other sorbent in terms of mercury removal. Sorbent C has improved performance compared to other sorbents only in terms of the reduced impact on foam index.

Comparison of Sorbent A and "Control Sorbent" Sample on Mercury Removal Performance Mercury removal performance was tested in a pilot-scale coal-fired furnace. This pilot-scale furnace burns pulverized coal and is equipped with air-cooled and water-cooled heat exchangers to simulate the temperature profile of a full-scale coal-fired boiler. The flue gas from the furnace after passing through the heat exchangers is sent to a tubular pilot-scale electrostatic precipitator (ESP), which serves as the particulate cleanup device. Typically, the pilot electrostatic precipitator was operated at 320° F.

Sorbent was injected into the flue gas upstream of the electrostatic precipitator. The temperature of the flue gas was approximately 300-350° F. The duct leading to the electrostatic precipitator was slightly heated to compensate for heat loss to the surrounding and to maintain a nominal 300-330° F. flue gas temperature entering the ESP. The ESP was also heated to maintain more or less a constant flue gas temperature leaving the ESP. Mercury concentrations were measured upstream the sorbent injection point and downstream the ESP, after the fly ash (with the sorbent) are removed.

A U.S. sub-bituminous Powder River Basin coal with low chlorine content of the coal was fired in the pilot-scale furnace. The carbon content of the fly ash without sorbent injection was very low, typically below about 0.5%. Typical mercury concentrations in the flue gas before sorbent injection and upstream of the pollution control system was about 7 µg/m3. Reduction from these levels with sorbent injection is shown in FIG. 5.

Sorbent A was injected at different injection rates and the mercury reduction was noted. A Control Sorbent with a similar surface area (Iodine Number ~550), impregnated with bromine for enhancement, but with a coarser particle size distribution ($d_{50}$ of 15-20 microns and $d_{95}$ of about 45 microns) was also used for comparison.

Figure 5:
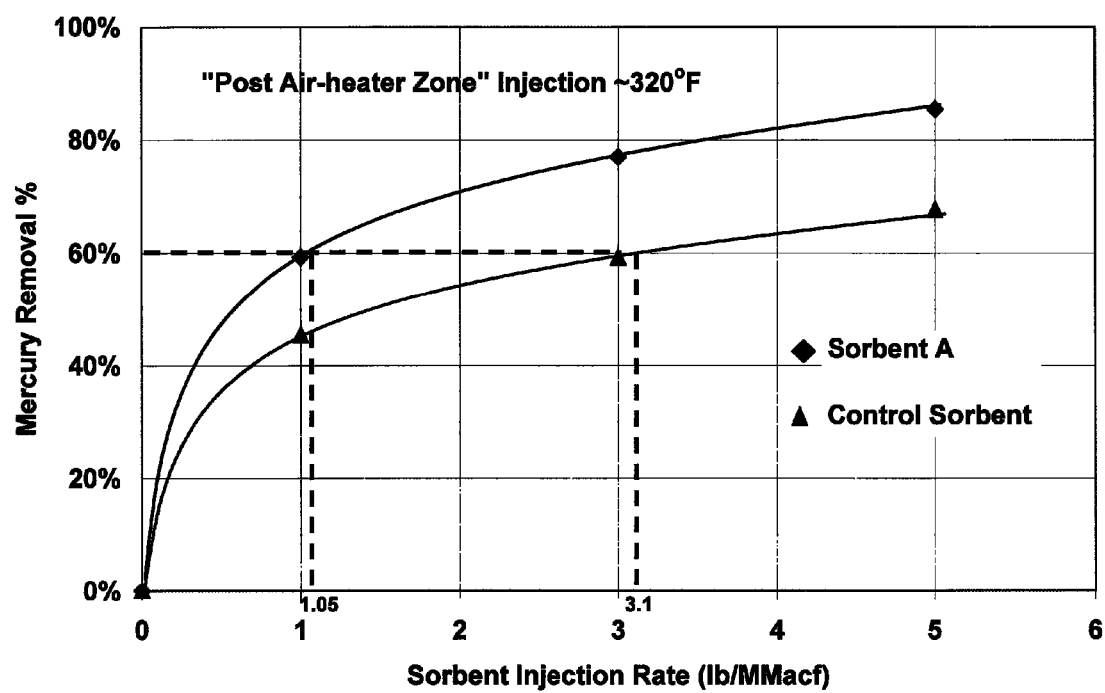
FIG. 5 is a graph detailing mercury removal rates for one inventive sorbent as compared to a control sorbent.

As shown in FIG. 5, the inventive Sorbent A provided a superior performance compared to the Control Sorbent.

Comparison of Sorbent D and Sorbent A* on Mercury Removal Performance

Mercury removal performance was tested in the pilot-scale coal-fired furnace as described above.

Sorbent was injected into the flue gas upstream of the electrostatic precipitator. Two injection locations were used. The injection temperature of the flue gas where the sorbent was injected was respectively 630° F. and 360° F. Mercury concentrations were measured upstream the sorbent injection point and downstream the ESP, after the fly ash (with the sorbent) are removed.

A U.S. sub-bituminous Powder River Basin coal with low chlorine content of the coal was fired in the pilot-scale furnace. The carbon content of the fly ash without sorbent injection was very low, typically below about 0.5%. $SO_3$ (20 ppm by volume) was injected into the flue gas close to the ESP inlet (~300-350° F.) to simulate conditioning of fly ash (decrease fly ash resistivity) and to improve ESP collection efficiency. It has been observed that injection of $SO_3$ into the flue gas for improving precipitator performance has a detrimental effect on mercury capture (larger quantities of sorbent are required to achieve a given removal efficiency). Typical mercury concentrations in the flue gas before sorbent injection and upstream of the pollution control system was about 9 μg/m3. Reduction from these levels with sorbent injection is shown in FIG. 6.

Sorbent A* (prepared in a manner similar to Sorbent A, but with lignite-derived activated carbon) was injected at different injection rates and the mercury reduction was noted. Sorbent D was also injected at the same location and comparison of the performance noted.

Figure 6:
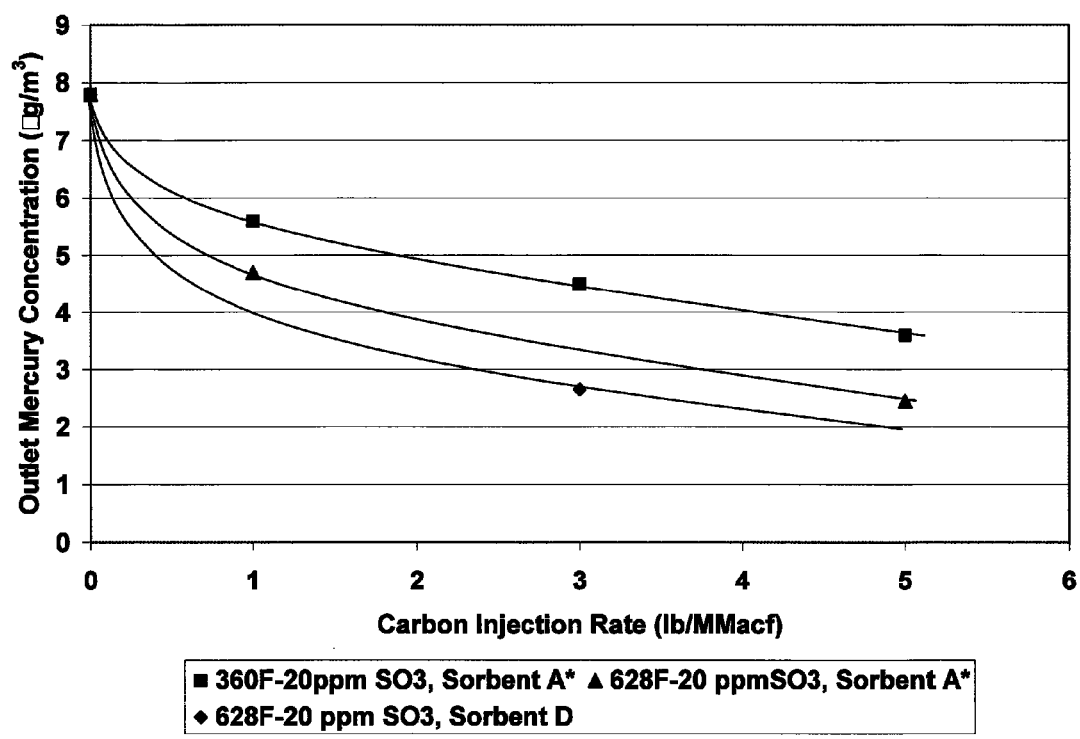
FIG. 6 is a graph detailing mercury removal rates for two of the inventive sorbents at different injection locations (flue gas temperatures)

From FIG. 6, which provides the outlet mercury concentrations with various sorbent injection rates, sorbent type, and sorbent injection temperature (sorbent injection location), it can be concluded that Sorbent D provided better performance compared to Sorbent A* for a given carbon injection rate.

Figure 7:
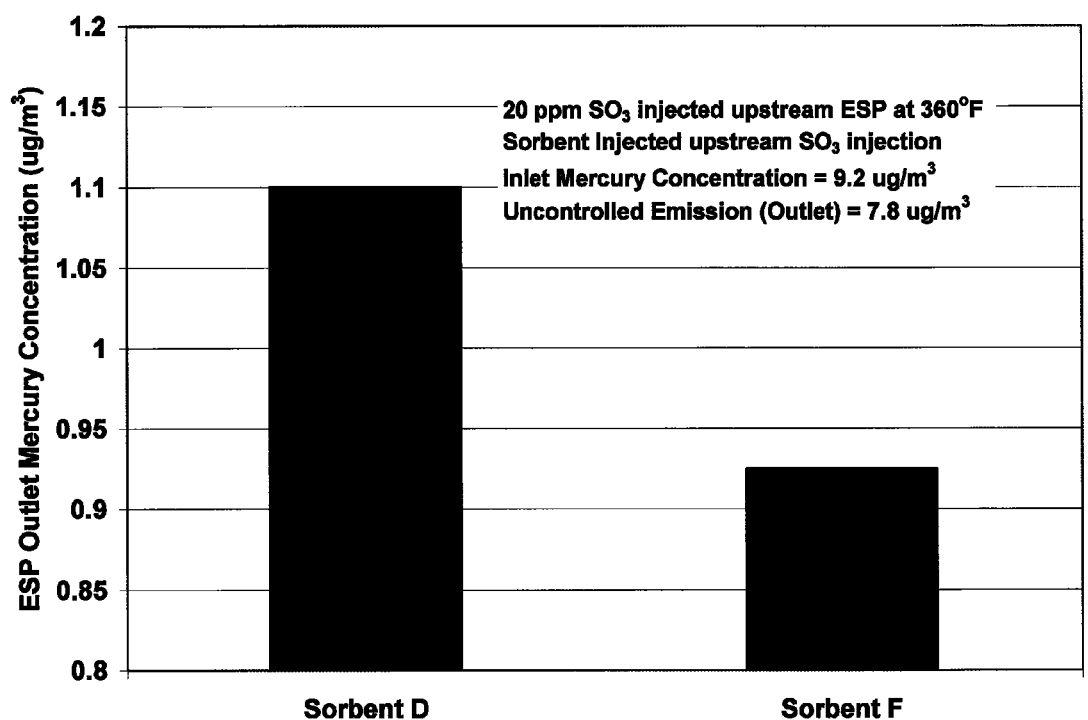
FIG. 7 shows data comparing mercury removal rates for two of the inventive sorbents.

FIG. 7 provides data for a similar experiment, which compares outlet mercury concentrations at the ESP achieved with injection of Sorbent D and Sorbent F. Sorbent F had a similar or slightly better performance compared to Sorbent D.

With respect to the above description then, it is to be realized that the optimum relationships for the elements of the invention, to include variations in size, materials, shape, form, function and manner of operation, assembly and use, are deemed apparent to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will occur to those skilled in the art, it is not desired to limit the invention to the exact construction and operation shown and described, and accordingly, all suitable modifications and equivalents may be resorted to, falling within the scope of the invention.

What is claimed is:

1. An adsorbent composition for removing mercury from a flue gas stream, comprising:
    powdered activated carbon having a mean particle size ($d_{50}$) of 20-25 microns or less, and comprising at least one separate alkaline component selected from the group of alkaline components consisting of sodium bicarbonate, sodium carbonate, ammonium carbonate, ammonium bicarbonate, potassium carbonate, potassium bicarbonate, trona, magnesium oxide, magnesium hydroxide, calcium oxide, calcium hydroxide, calcium bicarbonate and calcium carbonate dispersed thereon.

2. The adsorbent composition of claim 1 in which the powdered activated carbon further comprises at least one halogen-containing component dispersed thereon.

3. The adsorbent composition of claim 2 in which the halogen-containing component comprises bromine or bromine compounds.

4. The adsorbent composition of claim 1 in which the alkaline component is blended with the powdered activated carbon as fine particles.

5. The adsorbent composition of claim 4 in which the alkaline component mean particle size ($d_{50}$) is less than approximately 10 microns.

6. The adsorbent composition of claim 5 in which the alkaline component means particle size ($d_{50}$) is less than approximately 1 micron.

7. The adsorbent composition of claim 1 in which the alkaline component is blended with wet powdered activated carbon and reacts with the water to thereby assist in drying the powdered activated carbon.

8. The adsorbent composition of claim 4 in which powdered activated carbon is in part processed by particle size reduction.

9. The adsorbent composition of claim 8 in which the particle size reduction is accomplished by at least one of milling in a ball mill, or jet milling using a pressurized gas stream, to simultaneously grind, mix and composite the adsorbent composition.

10. The adsorbent composition of claim 9 in which the gas is heated to also simultaneously dry the adsorbent composition.

11. The adsorbent composition of claim 1 further comprising a flow agent dispersed on the powdered activated carbon.

12. The adsorbent composition of claim 11 in which the flow agent comprises ultra fine particles with a mean particle size ($d_{50}$) of the particles of less than approximately 1 micron.

13. The adsorbent composition of claim 12 in which the flow agent comprises silica particles.

14. The adsorbent composition of claim 12 in which the flow agent particles are hydrophobic.

15. The adsorbent composition of claim 1 in which the mean particle size ($d_{50}$) of the powdered activated carbon is less than approximately 10 microns.

16. An adsorbent composition for removing mercury from a flue gas stream, comprising:
    powdered activated carbon having a mean particle size ($d_{50}$) of 20-25 microns or less, and comprising a separate flow agent dispersed thereon.

17. The adsorbent composition of claim 16 in which the flow agent is hydrophobic.

18. The adsorbent composition of claim 16 in which the flow agent comprises ultra fine silica particles with a mean particle size ($d_{50}$) of less than approximately 1 micron.

19. The adsorbent composition of claim 18 in which the mean particle size ($d_{50}$) of the powdered activated carbon is less than approximately 10 microns.

20. An adsorbent composition for removing mercury from a flue gas stream, comprising:
    powdered activated carbon comprising a separate chemical component dispersed thereon that undergoes an endothermic decomposition at flue gas temperatures below about 1100° F.

21. The adsorbent composition of claim 20 in which the component comprises a metal hydroxide.

22. The adsorbent composition of claim 21 in which the metal hydroxide comprises one or more of magnesium hydroxide and calcium hydroxide.

23. The adsorbent composition of claim 20 in which the component comprises a metal acetate.

24. The adsorbent composition of claim 23 in which the component comprises one or more of calcium acetate, magnesium acetate and calcium magnesium acetate.

25. The adsorbent composition of claim 20 in which the component is alkaline.

26. The adsorbent composition of claim 25 in which the component is water soluble and added to the powdered activated carbon as a solution.

27. An adsorbent composition for removing mercury from a flue gas stream, comprising:
   dry powdered activated carbon having a mean particle size ($d_{50}$) of 20-25 microns or less, and comprising a separate chemical component dispersed thereon comprising a hydrophobic portion that is coupled to the activated carbon and a hydrophilic portion that increases stability in a water-based medium.

28. The adsorbent composition of claim 27 in which the hydrophilic portion comprises a sulfonate group.

29. The adsorbent composition of claim 28 in which the dispersed component comprises a salt of alkyl naphthalene sulfonate.

30. The adsorbent of claim 29 in which the dispersed component comprises Aerosol OS™.

31. A method of removing mercury from flue gas resulting from combustion, in which the flue gas is passed through a particle separator, comprising:
   injecting powdered activated carbon into the flue gas at one or more locations before the flue gas reaches the particle separator; and
   injecting a sacrificial agent into the flue gas at one or more locations before the flue gas reaches the particle separator, wherein the sacrificial agent is selected from the group of agents consisting of: organic compounds having sulfonate, carboxylate or amino functional groups; sodium methyl naphthalene sulfonate; phenyl glycol ethers; poly-napthalene sulfonate; sodium/calcium lignosulfonate; Aerosol-OS; salts of alkyl naphthalene sulfonates; and ethylene glycol phenyl ether.

32. The method of claim 31 in which the powdered activated carbon and the sacrificial agent are injected together.

33. The method of claim 31 in which the sacrificial agent is injected closer to the particle separator than is the powdered activated carbon.

* * * * *